US008394176B2

(12) United States Patent
Kanougi et al.

(10) Patent No.: US 8,394,176 B2
(45) Date of Patent: Mar. 12, 2013

(54) POLYIMIDE GAS SEPARATION MEMBRANE AND GAS SEPARATION METHOD

(75) Inventors: Tomonori Kanougi, Chiba (JP); Harutoshi Hoshino, Chiba (JP); Toshimune Yoshinaga, Chiba (JP); Yoji Kase, Chiba (JP); Kenji Fukunaga, Chiba (JP)

(73) Assignee: Ube Industries, Ltd., Yamaguchi (JP)

( * ) Notice: Subject to any disclaimer, the term of this patent is extended or adjusted under 35 U.S.C. 154(b) by 329 days.

(21) Appl. No.: 12/866,110

(22) PCT Filed: Feb. 4, 2009

(86) PCT No.: PCT/JP2009/051900
§ 371 (c)(1),
(2), (4) Date: Aug. 4, 2010

(87) PCT Pub. No.: WO2009/099109
PCT Pub. Date: Aug. 13, 2009

(65) Prior Publication Data
US 2011/0000367 A1  Jan. 6, 2011

(30) Foreign Application Priority Data

Feb. 5, 2008 (JP) .................................. 2008-024847
Jun. 25, 2008 (JP) .................................. 2008-165641
Jun. 25, 2008 (JP) .................................. 2008-165642

(51) Int. Cl.
*B01D 53/22* (2006.01)
*B01D 71/64* (2006.01)
*B01D 69/08* (2006.01)

(52) U.S. Cl. ................. 95/52; 95/45; 95/50; 96/4; 96/8; 96/10; 96/11; 96/13; 96/14; 210/640

(58) Field of Classification Search ................ 95/45, 50, 95/52; 96/4, 8, 10, 11, 12, 13, 14; 210/640
See application file for complete search history.

(56) References Cited

U.S. PATENT DOCUMENTS

| 4,512,893 | A | * | 4/1985 | Makino et al. ................. 96/10 |
| 4,997,462 | A | * | 3/1991 | Nakatani et al. .............. 210/640 |
| 5,112,941 | A | * | 5/1992 | Kasai et al. .................... 96/14 |
| 5,178,650 | A | * | 1/1993 | Hayes ............................ 95/51 |
| 5,340,904 | A | * | 8/1994 | Yang et al. ................... 528/185 |
| 7,025,804 | B2 | * | 4/2006 | Simmons et al. ................ 95/45 |

FOREIGN PATENT DOCUMENTS

| CN | 1068974 | 2/1993 |
| CN | 1293081 | 5/2001 |
| EP | 1 086 973 | 3/2001 |
| JP | 63-267415 | 11/1988 |
| JP | 2-222716 | 9/1990 |
| JP | 2-222717 | 9/1990 |
| JP | 2-268820 | 11/1990 |

OTHER PUBLICATIONS

International Search Report, PCT/JP2009/051900, Apr. 28, 2009.
Chinese Official Action—200980102661.2—Aug. 1, 2012.
Japanese Official Action—2009-024079—Jun. 19, 2012.

* cited by examiner

*Primary Examiner* — Jason M Greene
(74) *Attorney, Agent, or Firm* — Young & Thompson

(57) ABSTRACT

Disclosed are a gas separation membrane and a gas separation method in which at least one species of organic vapor is separated and recovered from an organic vapor mixture using the gas separation membrane. The gas separation membrane is made of an aromatic polyimide composed of a tetracarboxylic acid component consisting of an aromatic ring-containing tetracarboxylic acid and a diamine component comprising 10 to 90 mol % of a combination of (B1) 3,4'-diaminodiphenyl ether and (B2) 4,4'-diaminodiphenyl ether at a B1 to B2 molar ratio, B1/B2, ranging from 10/1 to 1/10, and 10 to 90 mol % of other aromatic diamine.

20 Claims, No Drawings

POLYIMIDE GAS SEPARATION MEMBRANE AND GAS SEPARATION METHOD

TECHNICAL FIELD

This invention relates to a gas separation membrane made of an aromatic polyimide having a specific chemical composition and having a high water vapor permeance, a high ratio of water vapor to organic vapor permeance, good resistance against a high-temperature organic vapor mixture, and the like. It also relates to a method for separating and recovering vapor of at least one organic component from an organic vapor mixture, which method includes heating a liquid mixture containing an organic compound to vaporize the mixture and bringing the resulting organic vapor mixture into contact with the gas separation membrane.

BACKGROUND ART

In recent years, bioethanol obtained by fermenting biomass to produce an aqueous ethanol solution and dehydrating and purify the ethanol solution has been attracting attention for use as an energy source. However, because ethanol and water form an azeotropic mixture, it is impossible to dehydrate and purify an aqueous ethanol solution to a purity of 96% by weight or more by ordinary distillation operations. Then, in order to obtain high purity ethanol with a minimum ethanol content of 99% by weight, azeotropic distillation using an entrainer, e.g., cyclohexane, has been practiced. On the other hand, a separation membrane is capable of easily separating an organic vapor mixture of water and ethanol that forms an azeotropic mixture by taking advantage of the difference in permeability between the components. Separating an aqueous ethanol solution into ethanol vapor and water vapor by the use of a separation membrane is a promising dehydration method for obtaining high purity ethanol as an approach to the establishment of an energy saving system replacing the azeotropic distillation method.

In general, organic vapor separation using a gas separation membrane module is performed as follows. A liquid mixture containing an organic compound is heated to form an organic vapor mixture, which is fed into a gas separation module from a mixed gas inlet. While flowing in the module in contact with a separation membrane, the organic vapor mixture is separated into permeate vapor (vapor having passed through the membrane) and retentate or non-permeate vapor (vapor having been rejected by the membrane). The permeate vapor is recovered from a permeate outlet, and the retentate vapor is recovered from a retentate outlet. The permeate vapor is rich in a component having a high permeation rate through the membrane (hereinafter also referred to a readily permeable component), while the retentate vapor has a diminished content of the readily permeable component. As a result, the organic vapor mixture is separated into permeate vapor rich in the readily permeable component and retentate vapor with a scarce readily permeable component.

Patent document 1 (see below) proposes using a gas separation membrane made of polyimide in a organic vapor dehydration process in which an aqueous solution containing an organic substance is vaporized into a gas mixture containing organic vapor and water vapor, and the water vapor is selectively excluded to give a high concentration organic solvent. The polyimide used to make the gas separation membrane is composed of an aromatic tetracarboxylic acid skeleton as a tetracarboxylic acid component derived from 3,3',4,4'-biphenyltetracarboxylic acid and/or 2,3,3',4'-biphenyltetracarboxylic acid and an aromatic diamine backbone as a diamine component derived from at least one diamine selected from the group consisting of 3,4'-diaminodiphenyl ether, 4,4'-diaminodiphenyl ether, and diaminodiphenylmethane.

However, the polyimide hollow fiber membrane made of the aromatic polyimide disclosed in Patent document 1 has a water vapor permeance ($P'_{H2O}$) of $1.47 \times 10^{-3}$ cm$^3$(STP)/cm$^2$·sec·cmHg at the highest and a water vapor to ethanol vapor permselectivity (i.e., permeance ratio: $P'_{H2O}/P'_{EtOH}$) of no more than 22. In particular, the polyimide hollow fiber membrane made of an aromatic polyimide composed of a tetracarboxylic acid skeleton derived from 3,3',4,4'-biphenyltetracarboxylic acid and a diamine backbone derived from 60 mol % of 3,4'-diaminodiphenyl ether and 40 mol % of 4,4'-diaminodiphenyl ether has a water vapor permeance ($P'_{H2O}$) of $1.24 \times 10^{-3}$ cm$^3$(STP)/cm$^2$·sec·cmHg.

Patent document 2 (see below) discloses a soluble aromatic polyimide prepared by polymerizing and imidizing a tetracarboxylic acid component mainly comprising a biphenyltetracarboxylic acid and an aromatic diamine component comprising 25 to 100 mol % of a 2,2-bis[(aminophenoxy)phenyl]propane (BAPP) in an organic solvent, such as a phenol compound.

Patent document 3 (see below) discloses a gas separation membrane mainly comprising an aromatic polyimide obtained by copolymerizing a tetracarboxylic acid component mainly comprising a biphenyltetracarboxylic acid and a diamine component mainly comprising a 1,4-bis(4-aminophenoxy)benzene (TPEQ) and a diaminodiphenyl ether (DADE) and an aromatic polyimide obtained by copolymerizing a tetracarboxylic acid component mainly comprising a biphenyltetracarboxylic acid and a diamine component mainly comprising a 1,4-bis(4-aminophenoxy)benzene (TPEQ) and a 1,3-bis(aminophenoxy)benzene (TPER). The gas separation membrane is described as exhibiting high levels of heat resistance, water resistance, gas separation performance (permeability to water vapor and water/organic substance permselectivity) and, in particular, resistance to a high-temperature liquid mixture of water and an organic substance.

Patent document 1: JP 63-267415A
Patent document 2: JP 02-222716A
Patent document 3: JP 02-222717A

DISCLOSURE OF INVENTION

Problem to be Solved by the Invention

Dehydration of an aqueous solution of an organic compound, like ethanol, has a problem that a separation membrane of large area would be necessary, making the time required for dehydration longer, unless it has a sufficient water vapor permeance. There is another problem that the separation involves an increased permeation loss of the organic compound, such as ethanol, unless the separation membrane has a sufficient water vapor to organic vapor (e.g., ethanol vapor) permselectivity. That is, a high water vapor permeance and a high water vapor/organic vapor permselectivity are both demanded.

However, the polyimide hollow fiber membranes made of the aromatic polyimides described in Patent documents 2 and 3 do not necessarily exhibit sufficient gas separation performance (water vapor permeability and water/organic substance permselectivity) and needs further improvement. The polyimide hollow fiber membranes made of an aromatic polyimide composed of a tetracarboxylic acid skeleton derived from 3,3',4,4'-biphenyltetracarboxylic acid and a diamine backbone derived from 30 mol % of 3,4'-diaminodiphenyl ether and 70 mol % of 2,2-bis[4-(4-aminophenoxy)phenyl]

propane disclosed in the working example of Patent document 2 is, while satisfactory in hot water resistance, insufficient in water vapor permeability and permselectivity and, in particular, has a relatively low water vapor/ethanol vapor permselectivity as compared with the polyimide hollow fiber membranes of other working examples of the same document. The polyimide hollow fiber membrane made of an aromatic polyimide composed of a tetracarboxylic acid skeleton derived from 3,3',4,4'-biphenyltetracarboxylic acid and a diamine backbone derived from 50 mol % of 1,4-bis(4-aminophenoxy)benzene and 50 mol % of 3,4'-diaminodiphenyl ether disclosed in the working example of Patent document 3 is, while satisfactory in hot water resistance, insufficient in water vapor permeability and permselectivity and, in particular, has a relatively low water vapor/ethanol vapor permselectivity as compared with the polyimide hollow fiber membranes of other working examples of the same document.

To accomplish efficient vapor separation, an organic vapor mixture is usually fed to a separation membrane under an elevated feed pressure. This means that a gas separation membrane is always in contact with high-temperature and high-pressure organic vapor. When used to separate a water-containing liquid, it is also kept in contact with water vapor. Therefore, a gas separation membrane is required not to change even in contact with high temperature and high pressure organic vapor and water vapor, i.e., to have resistance against high temperature vapor of water and an organic substance.

Accordingly, an object of the invention is to provide a gas separation membrane suitable for separating an organic vapor mixture containing vapor of an organic compound, like ethanol, by a vapor permeation method, particularly a gas separation membrane exhibiting improvements in water vapor permeability, water vapor to organic vapor permselectivity, and good resistance against high-temperature water and organic vapor, and the like.

Another object of the invention is to provide a gas separation method in which an organic vapor mixture is brought into contact with the gas separation membrane to separate and recover the organic vapor.

Means for Solving the Problem

As a result of intensive investigations, the present inventors have found that the above objects are accomplished by the provision of a gas separation membrane made of an aromatic polyimide prepared from a tetracarboxylic acid component and an aromatic diamine component, the aromatic diamine component containing specific diamines in a specific ratio. The invention has thus been completed.

The invention relates to a gas separation membrane comprising an aromatic polyimide having a repeating unit represented by general formula (1) shown below (hereinafter sometimes referred to as the first gas separation membrane).

[Formula 1]

General Formula (1)

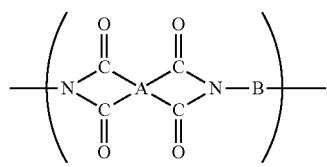

wherein A represents a tetravalent group having an aromatic ring; and B represents divalent groups comprising 10 to 90 mol % of a combination of a divalent group B1 having a 3,4'-diphenyl ether structure of chemical formula (B1) shown below and a divalent group B2 having a 4,4'-diphenyl ether structure of chemical formula (B2) shown below and 10 to 90 mol % of an aromatic ring-containing divalent group B3 different from the divalent groups B1 and B2, with the B1/B2 divalent group molar ratio ranging from 10/1 to 1/10.

[Formula 2]

Chemical Formula (B1)

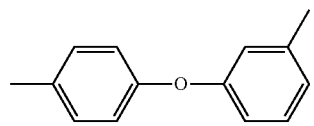

[Formula 3]

Chemical Formula (B2)

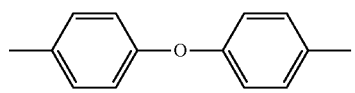

The invention also relates to the first gas separation membrane, wherein the divalent group B3 in general formula (1) comprises at least one divalent group represented by chemical formula (B3):

[Formula 4]

Chemical Formula (B3)

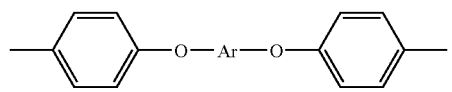

wherein Ar represents a divalent group represented by chemical formula (Ar1), (Ar2), (Ar3), or (Ar4):

[Formula 5]

Chemical Formula (Ar1)

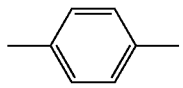

Chemical Formula (Ar2)

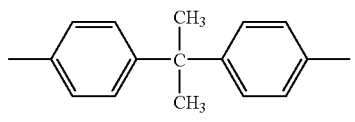

Chemical Formula (Ar3)

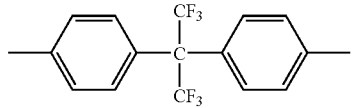

Chemical Formula (Ar4)

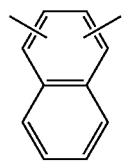

The invention also relates to a gas separation membrane made of an aromatic polyimide having a repeating unit represented by general formula (1) shown below (hereinafter also referred to as the second gas separation membrane).

[Formula 6]

General Formula (1)

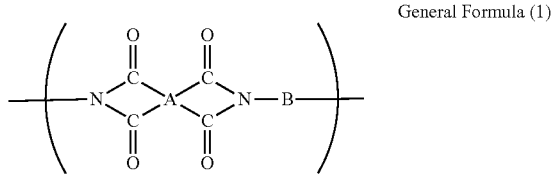

wherein A represents a tetravalent group having an aromatic ring; and B represents divalent groups comprising 10 to 100 mol % of a bis(phenoxy)naphthalene structure represented by chemical formula (2):

[Formula 7]

Chemical Formula (2)

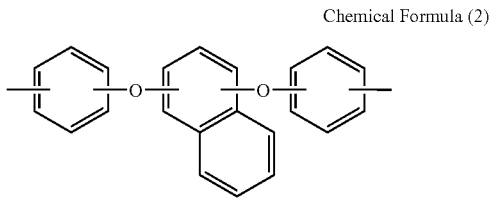

The invention also relates to the first or second gas separation membrane, wherein the aromatic ring-containing tetravalent group represented by A in general formula (1) is a biphenyl structure represented by chemical formula (A) below.

[Formula 8]

Chemical Formula (A)

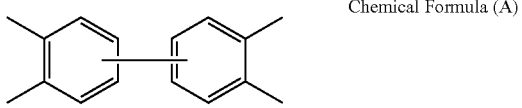

The invention also relates to the first or second gas separation membrane which has an asymmetric structure constituted of a dense layer and a porous layer.

The invention also relates to the first or second gas separation membrane which is a hollow fiber membrane.

The invention also relates to the first or second gas separation membrane which has a solvent resistance index of 50% or higher.

The invention also relates to the first or second gas separation membrane which has a water vapor permeance $P'_{H2O}$ of $1.0 \times 10^{-3}$ to $10.0 \times 10^{-3}$ cm$^3$(STP)/cm$^2$·sec·cmHg and a water vapor to ethanol vapor permeance ratio ($P'_{H2O}/P'_{EtOH}$) of 100 or more.

The invention also relates to a gas separation method including heating a liquid mixture containing an organic compound to vaporize the mixture, bringing the resulting organic vapor mixture into contact with the feed side of a gas separation membrane to selectively cause a readily permeable component to permeate the gas separation membrane, and obtaining readily permeable component-enriched permeate vapor from the permeate side of the gas separation membrane and non-permeate vapor substantially freed of the readily permeable component from the feed side of the gas separation membrane, wherein the gas separation membrane is the first or second gas separation membrane of the invention.

The invention also relates to the gas separation method, wherein the organic compound is a compound having a boiling point of 0° to 200° C., particularly a lower aliphatic alcohol with 1 to 6 carbon atoms, a ketone with 3 to 6 carbon atoms, or an ester with 2 to 7 carbon atoms.

The invention also relates to the gas separation method, wherein the readily permeable component is water vapor.

BEST MODE FOR CARRYING OUT THE INVENTION

The first gas separation membrane of the invention is described first.

The aromatic polyimide having a repeating unit of general formula (1), which forms the first gas separation membrane of the invention, is prepared by polymerizing a tetracarboxylic acid component containing an aromatic tetracarboxylic acid and a diamine component containing 3,4'-diaminodiphenyl ether (34DADE), 4,4'-diaminodiphenyl ether (44DADE), and other aromatic diamine(s) in an organic solvent, such as a phenol compound, followed by imidization. The other aromatic diamine is different from 3,4'-diaminodiphenyl ether and 4,4'-diaminodiphenyl ether.

In general formula (1), the diamine residue represented by B consists of 10 to 90 mol %, preferably 20 to 80 mol %, more preferably 30 to 70 mol %, still more preferably 40 to 60 mol %, of a combination of a divalent group B1 derived from 3,4'-diaminodiphenyl ether and a divalent group B2 derived from 4,4'-diaminodiphenyl ether, and the balance of a divalent group B3 derived from other aromatic diamine.

If the total of the divalent groups B1 and B2 exceeds 90 mol %, the polyimide is liable to have poor water resistance. If it is less than 10 mol %, the polyimide membrane is liable to have reduced permeation separation performance.

In general formula (1), the molar ratio of the divalent group B1 derived from 3,4'-diaminodiphenyl ether to the divalent group B2 derived from 4,4'-diaminodiphenyl ether, B1/B2, is 10/1 to 1/10, preferably 8/1 to 1/8, more preferably 6/1 to 1/6, even more preferably 5/1 to 1/5.

If B1/B2 is greater than 10/1 or smaller than 1/10, the polyimide membrane tends to have low permeation separation performance.

It is preferred that the divalent group B3 in general formula (1) be one or more kinds of a divalent group represented by chemical formula (B3) below:

[Formula 9]

Chemical Formula (B3)

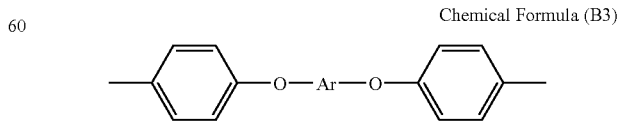

wherein Ar represents a divalent group represented by chemical formula (Ar1), (Ar2), (Ar3), or (Ar4):

[Formula 10]

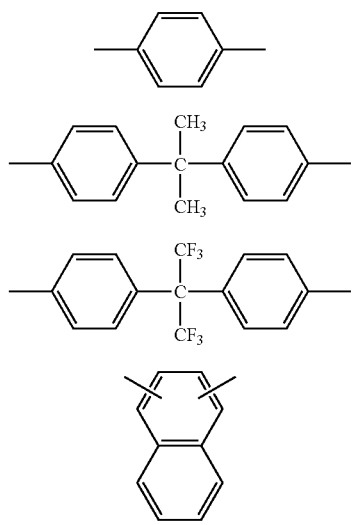

Chemical Formula (Ar1)

Chemical Formula (Ar2)

Chemical Formula (Ar3)

Chemical Formula (Ar4)

The other aromatic diamines that can be used to introduce the divalent groups B3 into an aromatic polyimide include bis(aminophenoxy)benzenes (TPEQ), bis(aminophenoxy)naphthalenes (APN), bis[(aminophenoxy)phenyl]propanes (BAPP), bis[(aminophenoxy)phenyl]hexafluoropropanes (HFBAPP), bis[(aminophenoxy)phenyl]sulfones (BAPS), bis[(aminophenoxy)phenyl]biphenyls (BAPB), and diaminodiphenylmethanes (DADM). Among them, 1,4-bis(4-aminophenoxy)benzene, 2,2-bis[(4-aminophenoxy)phenyl]propane, 2,2-bis[(4-aminophenoxy)phenyl]hexafluoropropane, and 1,4-bis(4-aminophenoxy)naphthalene are preferred, by which the divalent group represented by chemical formula (B3) is introduced into an aromatic polyimide.

In general formula (1), the aromatic ring-containing tetravalent group as represented by A is preferably a biphenyl structure represented by chemical formula (A):

[Formula 10]

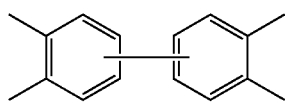

Chemical Formula (A)

Aromatic tetracarboxylic acids that can be used to introduce the aromatic ring-containing tetravalent group A into an aromatic polyimide are preferably biphenyltetracarboxylic acids, such as 3,3',4,4'-biphenyltetracarboxylic acid, 2,3,3',4'-biphenyltetracarboxylic acid, 2,2',3,3'-biphenyltetracarboxylic acid, and their dianhydrides and esters, with 3,3',4,4'-biphenyltetracarboxylic acid dianhydride being more preferred.

In addition to the biphenyltetracarboxylic acids described above, other tetracarboxylic acid components may be used to make the aromatic polyimide in a minor proportion, preferably not more than 20 mol %, more preferably 10 mol % or less, with respect to the tetracarboxylic acid component, including pyromellitic acids, benzophenonetetracarboxylic acids, diphenyl ether tetracarboxylic acids, diphenyl sulfone tetracarboxylic acids, 2,2-bis(dicarboxyphenyl)propanes, 2,2-bis(dicarboxyphenyl)hexafluoropropanes, 2,2-bis[(dicarboxyphenoxy)phenyl]propanes, 2,2-bis[(dicarboxyphenoxy)phenyl]hexafluoropropanes, and their dianhydrides and esters.

The second gas separation membrane of the invention is then described.

The aromatic polyimide having a repeating unit represented by general formula (1), which forms the second gas separation membrane of the invention, is prepared by polymerizing a tetracarboxylic acid component containing an aromatic tetracarboxylic acid and a diamine component containing a bis(aminophenoxy)naphthalene (APN) and other diamine(s) in an organic solvent, such as a phenol compound, followed by imidization.

The proportion of the bis(aminophenoxy)naphthalene (APN) in the diamine component is 10 to 100 mol %. The lower limit of that proportion is preferably 20 mol %, more preferably 30 mol %, even more preferably 40 mol %, and the upper limit of that proportion is preferably 95 mol %, more preferably 90 mol %.

Examples of the bis(aminophenoxy)naphthalenes (APN) include 1,4-bis(4-aminophenoxy)naphthalene, 1,4-bis(3-aminophenoxy)naphthalene, and 1,3-bis(4-aminophenoxy)naphthalene, with 1,4-bis(4-aminophenoxy)naphthalene being preferred.

Preferred examples of the other diamines that may be used in combination with the bis(aminophenoxy)naphthalenes (APN) include 3,4'-diaminodiphenyl ether (34DADE) and/or 4,4'-diaminodiphenyl ether (44DADE). Examples of the usable other diamines also include 1,3-bis(4-aminophenoxy)benzene, 1,4-bis(4-aminophenoxy)benzene, 4,4'-diaminodiphenylmethane, 4,4'-diaminodiphenyl sulfone, 4,4'-diaminobenzophenone, 2,2-bis(4-aminophenyl)propane, 2,2-bis(3-aminophenyl)propane, 2-(4-aminophenyl)-2-(3-aminophenyl)propane, bis[4-(4-aminophenoxy)phenyl]sulfone, o-tridine, o-tridine sulfone, o-, m-, or p-phenylenediamine, 3,5-diaminobenzoic acid, and 2,6-diaminopyridine.

Examples of the tetracarboxylic acid component include those described as the aromatic tetracarboxylic acids for introducing the aromatic ring-containing tetravalent group A to an aromatic polyimide to make the first gas separation membrane.

The first and second gas separation membranes of the invention preferably have a water vapor permeance $P'_{H2O}$ of $1.0 \times 10^{-3}$ cm$^3$(STP)/cm$^2$·sec·cmHg or more, more preferably $1.2 \times 10^{-3}$ cm$^3$(STP)/cm$^2$·sec·cmHg or more, even more preferably $1.5 \times 10^{-3}$ cm$^3$(STP)/cm$^2$·sec·cmHg or more, most preferably $2.0 \times 10^{-3}$ cm$^3$(STP)/cm$^2$·sec·cmHg or more. The upper limit of the water vapor permeance is about $10.0 \times 10^{-3}$ cm$^3$(STP)/cm$^2$·sec·cmHg. The water vapor permeance is usually $6.0 \times 10^{-3}$ cm$^3$(STP)/cm$^2$·sec·cmHg or less.

To continuously remove water vapor from an organic substance aqueous solution, it is desirable for the separation membrane to have a large water vapor permeance. If the water vapor permeance is smaller than the value recited above, it would be necessary to extend the time for water vapor removal or to increase the membrane surface area used for water vapor removal, which is significantly disadvantageous for industrial implementation.

The first and second gas separation membranes of the invention preferably have a water vapor to ethanol vapor permeance ratio ($P'_{H2O}/P'_{EtOH}$; water vapor/ethanol vapor permselectivity) of 100 to 10000, more preferably 150 or greater, even more preferably 200 or greater, most preferably 250 or greater. If the water vapor/ethanol vapor permselectivity is smaller than the value recited above, a considerable amount of the organic substance will be lost due to permeation, which is industrially disadvantageous.

The first and second gas separation membranes of the invention each preferably have an asymmetric structure constituted of, for example, a dense layer with a thickness of 0.01 to 5 μm and a porous layer with a thickness of 10 to 200 μm, more preferably an asymmetric structure in which the dense layer and the porous layer are continuous with each other. The form of the separation membrane is not particularly limited, but a hollow fiber membrane is preferred for the advantages of large effective surface area and high pressure resistance.

The first and second gas separation membranes of the invention each preferably have a solvent resistance index of 50% or higher. The "solvent resistance index" is obtained as follows. A hollow fiber membrane is immersed in a 60 wt % aqueous ethanol solution at 150° C. for 20 hours, and a change of elongation at break of the membrane caused by the immersion is examined. The term "solvent resistance index" is defined to be the percentage of the elongation at break after the immersion to that before the immersion. In order to continuously remove water vapor from vapor of an organic substance aqueous solution, stability against high temperature organic vapor and water vapor is necessary.

For the gas separation membrane to have a high solvent resistance index indicates that the membrane does not change in an environment having high-temperature organic substance and water vapors.

The first and second gas separation membranes of the invention are produced in the conventional manner for making an aromatic polyimide gas separation membrane, except for using an aromatic polyimide having a repeating unit of general formula (1). For example, a hollow fiber gas separation membrane can be made as followed.

Preparation of Aromatic Polyimide Solution

The aromatic polyimide making a gas separation membrane is obtained as a polyimide solution by polymerizing and imidizing substantially equimolar proportions of a tetracarboxylic acid component and a diamine component in an organic solvent.

The polymerization and imidization are appropriately carried out either in a two-step process, in which predetermined proportions of a tetracarboxylic acid component and a diamine component are added to an organic solvent and polymerized at low temperature (around room temperature) to prepare a polyamic acid, which is then imidized by heating at about 100° to 250° C., preferably about 130° to 200° C., or chemically imidized by adding pyridine, acetic anhydride, or the like, or a one-step process, in which predetermined proportions of a tetracarboxylic acid component and a diamine component are added to an organic solvent and polymerized and imidized at a high temperature of about 100° to 250° C., preferably about 130° to 200° C. When imidization is effected by heating, it is preferably carried out while removing released water or alcohol. The amounts of the tetracarboxylic acid component and the diamine component relative to the organic solvent are preferably such that the resulting polyimide solution may have a polyimide concentration of about 5% to 50% by weight, preferably 5% to 40% by weight.

The polyimide solution as obtained by the polymerization and imidization may be used as such. Alternatively, the polyimide may be isolated from the resulting polyimide solution by, for example, putting the solution in a non-solvent incapable of dissolving the polyimide thereby to precipitate the polyimide, and the thus isolated polyimide is dissolved in an organic solvent in a prescribed concentration to make a polyimide solution for use.

The organic solvent dissolving the polyimide is not particularly limited as long as it is capable of dissolving the aromatic polyimide. Examples of suitable solvents include phenolic solvents, such as phenols, e.g., phenol, cresol, and xylenol, catechols having two hydroxyl groups directly bonded on a benzene ring, e.g., catechol and resorcinol, and halogenated phenols, e.g., 3-chlorophenol, 4-chlorophenol (equal to p-chlorophenol described later), 3-bromophenol, 4-bromophenol, and 2-chloro-5-hydroxytoluene; amide solvents, such as N-methyl-2-pyrrolidone, N,N-dimethylformamide, N,N-diethylformamide, N,N-dimethylacetamide, and N,N-diethylacetamide; and mixtures thereof.

Spinning of Aromatic Polyimide Solution into Hollow Fiber

The asymmetric membrane of the invention (a gas separation membrane having an asymmetric structure constituted of a dense layer and a porous layer) may be obtained by a phase inversion process using the polyimide solution. A phase inversion process is a known technique, in which a dissolved polymer is brought into contact with a coagulation bath to precipitate into membrane by phase inversion. In the invention, a dry-wet phase formation process proposed by Loeb, et al. (see, e.g., U.S. Pat. No. 3,133,132) is employed, in which a dissolved polymer in membrane form is precipitated by evaporation of the solvent existing on the surface of the membrane to form a thin dense layer, and the dissolved polymer is then immersed in a coagulation bath (a solvent compatible with the solvent of the polymer solution and incapable of dissolving the polymer) to make fine pores by the thus induced phase separation thereby forming a porous layer.

The asymmetric membrane of the invention is suitably obtained as a hollow fiber membrane by adopting a dry-wet spinning process. The dry-wet spinning process is an application of the aforementioned dry-wet phase inversion process to a polymer solution having been extruded through a spinneret into a hollow fiber to manufacture an asymmetric hollow fiber membrane. More specifically, a polymer solution is forced through a spinneret nozzle into a hollow fiber geometry. Immediately thereafter, the spun hollow fiber is passed through an air or nitrogen gas atmosphere and then immersed in a coagulation bath substantially incapable of dissolving the polymer component and miscible with the solvent of the polymer solution to form an asymmetric structure. Subsequently, the hollow fiber is dried and, if necessary, heat treated to make a separation membrane. Any spinneret configured to extrude a polyimide solution into a hollow fiber may be used. For example, a tube-in orifice spinneret is suitable. Usually, the temperature of the polyimide solution to be extruded is preferably about 20° to 150° C., more preferably 30° to 120° C. Spinning of the polyimide solution is performed while feeding gas or liquid into the inside of a hollow fiber.

The polyimide solution to be extruded through a spinneret preferably has a polyimide concentration of 5% to 40% by weight, more preferably 8% to 25% by weight, and a solution viscosity (rotational viscosity) at 100° C. of 300 to 20000 poise, more preferably 500 to 15000 poise, even more preferably 1000 to 10000 poise. Coagulation is preferably carried out by immersing the spun hollow stream in a first coagulation bath where the hollow stream is coagulated to an extent enough to retain its shape (e.g., hollow fiber geometry), taking up the hollow fiber by a guide roll, and immersing the hollow fiber in a second coagulating bath where the whole membrane is thoroughly coagulated. Examples of suitable coagulating baths include, but are not limited to, water, lower alcohols, such as methanol, ethanol, and propyl alcohol, ketones having a lower alkyl group, such as acetone, methyl ethyl ketone, and diethyl ketone, and mixtures thereof. Drying of the coagulated membrane is efficiently conducted by replacing the coagulating bath with a solvent, such as a hydrocarbon, prior to drying. The heat treatment, if performed, is preferably at a temperature lower than the softening temperature of the constituting polyimide.

The gas separation method according to the invention using the first or second gas separation membrane of the invention will then be described.

The gas separation method of the invention includes bringing an organic vapor mixture (feed gas) produced by heating and evaporating a liquid mixture containing an organic compound into contact with one side of the gas separation membrane of the invention preferably at a temperature of at least 70° C., more preferably 80° to 200° C., even more preferably 100° to 160° C., to selectively cause a readily permeable component to pass through the membrane and obtaining readily permeable component-enriched organic vapor from the permeate side of the membrane while recovering organic vapor substantially free from the readily permeable component from the retentate or non-permeate side (gas feed side) of the membrane, thereby to accomplish gas separation of the organic vapor mixture.

It is preferred to keep a difference in partial pressure of the readily permeable component between the feed side and the permeate side of the gas separation membrane by, for example, maintaining the permeate side of the membrane under reduced pressure. More preferably, the pressure on the permeate side is controlled at 1 to 500 mmHg. Maintaining the permeate side of the gas separation membrane under such reduced pressure accelerates the selective permeation of the readily permeable component as much as possible, thereby to facilitate selective removal of the readily permeable component from the organic vapor mixture fed to the feed side of the membrane. The higher the degree of pressure reduction, the higher the vapor permeance.

Means for securing the difference in partial pressure of the readily permeable component between the feed side and the permeate side of the gas separation membrane include maintaining the pressure on the feed side at an elevated level and making a dry gas flow in the permeate side as a carrier gas as well as maintaining the permeate side under reduced pressure. The means to be used is not particularly limited, and two or more means may be used simultaneously.

In the gas separation method of the invention, the organic vapor mixture fed to the gas separation membrane may have atmospheric pressure or an elevated pressure. It is particularly preferred for the organic vapor mixture to have an elevated pressure of 0.1 to 2 MPaG, more preferably 0.15 to 1 MPaG. The permeate side of the gas separation membrane may be kept under an elevated, atmospheric, or reduced pressure. It is particularly preferred to maintain the permeate side under reduced pressure.

Gas separation is suitably performed while using a dry gas flowing in the permeate side of the gas separation membrane as a carrier gas to facilitate selective permeation and removal of water vapor. Any gas that contains no readily permeable components or containing a readily permeable component, if any, at a smaller partial pressure than the partial pressure of the retentate gas, such as nitrogen or air, may be used as a carrier gas. Nitrogen is preferred because it hardly permeates from the permeate side to the feed side and also because it is inert, which is advantageous for accident prevention. It is also suitable that part of the retentate gas resulting from the removal of the readily permeable component is circulated to a carrier gas inlet and used as a carrier gas.

While the organic vapor mixture as a feed gas is not limited by the method of preparation, it is generally prepared by evaporating an aqueous solution of an organic compound by heating at the boiling point of the organic compound or a temperature higher than the azeotropic temperature. A liquid mixture containing an organic compound, such as an aqueous solution of the above described organic compound, is heated and evaporated using, e.g., evaporation or distillation equipment and the resulting organic vapor mixture is fed in an atmospheric state or a state pressurized to about 0.1 to 2 MPaG to a gas separation module for organic vapor separation using the gas separation membrane of the invention. The organic vapor mixture in a pressurized state may be obtained either by use of a pressure evaporator or by once preparing an organic vapor mixture in an atmospheric state by use of an atmospheric distiller and pressurizing the atmospheric, organic vapor mixture by use of a vapor compressor.

The organic vapor mixture is preferably fed to the gas separation module for organic vapor separation in a state heated to a temperature enough to be prevented from condensing while flowing inside the hollow fiber until it is withdrawn from the retentate gas outlet of the module.

The organic vapor mixture being fed to a gas separation module for organic vapor separation having the gas separation membrane of the invention is preferably at a temperature of 80° C. or higher, more preferably 90° C. or higher, even more preferably 100° C. or higher.

The concentration of the organic vapor in the organic vapor mixture is not particularly limited but is preferably 50% by weight or more, more preferably 70 to 99.8% by weight.

The organic compound that becomes organic vapor is preferably an organic compound having a boiling point of 0° to 200° C., more preferably an organic compound that is liquid at room temperature (25° C.) and has a boiling point of 150° C. or lower. The boiling point range of from 0° to 200° C. is practical in view of the working temperature range of the hollow fiber membrane, the equipment for heating and evaporating the organic vapor mixture, the equipment for condensing and recovering the purified component, and ease of handling.

Examples of such organic compounds include lower aliphatic alcohols having 1 to 6 carbon atoms, such as methanol, ethanol, n-propanol, isopropyl alcohol, n-butanol, sec-butanol, tert-butanol, pentanol, hexanol, and ethylene glycol; alicyclic alcohols, such as cyclopentanol and cyclohexanol; aromatic alcohols, such as benzyl alcohol; organic carboxylic acids, such as formic acid, acetic acid, propionic acid, and butyric acid; esters having 2 to 7 carbon atoms, such as methyl formate, ethyl formate, propyl formate, butyl formate, methyl acetate, ethyl acetate, propyl acetate, butyl acetate, methyl propionate, ethyl propionate, and butyl propionate; aliphatic ketones having 3 to 7 carbon atoms, such as acetone, methyl ethyl ketone, diethyl ketone, 2-pentanone, methyl isopropyl ketone, 3-hexanone, 2-hexanone, methyl isobutyl ketone, and pinacoline; cyclic ethers, such as tetrahydrofuran and dioxane; and organic amines, such as dibutylamine and aniline.

The gas separation method of the invention is particularly suitably applied to acquisition of high purity alcohol vapors by dehydrating an organic vapor mixture consisting of water vapor and alcohol vapor that is obtained by evaporating an aqueous solution of a lower aliphatic alcohol with 1 to 6 carbon atoms, such as methanol, ethanol, or isopropyl alcohol.

EXAMPLES

The present invention will now be illustrated in greater detail by way of Examples, but it should be understood that the invention is not deemed to be limited thereto.

Abbreviations of chemical substances used in Examples have the following meanings.
s-BPDA: 3,3',4,4'-biphenyltetracarboxylic acid dianhydride
6FDA: 2,2-bis(3,4-dicarboxyphenyl)hexafluoropropane dianhydride
DSDA: 3,3',4,4'-diphenylsulfonetetracarboxylic acid dianhydride
34DADE: 3,4'-diaminodiphenyl ether
44DADE: 4,4'-diaminodiphenyl ether
TPEQ: 1,4-bis(4-aminophenoxy)benzene
HFBAPP: 2,2-bis[4-(4-aminophenoxy)phenyl]hexafluoropropane
BAPP 2,2-bis[4-(4-aminophenoxy)phenyl]propane
APN: 1,4-bis(4-aminophenoxy)naphthalene Example 1

Preparation of Aromatic Polyimide Solution

In a separable flask equipped with a heater, a stirrer, and an inlet and an outlet tube for nitrogen gas were put 28.9 g of a tetracarboxylic acid component consisting of 100 mol % of 3,3',4,4'-biphenyltetracarboxylic acid dianhydride (s-BPDA) and 25.5 g of a diamine component consisting of 20 mol % of 3,4'-diaminodiphenyl ether (34DADE), 20 mol % of 4,4'-diaminodiphenyl ether (44DADE), and 60 mol % of 1,4-bis(4-aminophenoxy)benzene (TPEQ) together with 248 g of p-chlorophenol (PCP) and polymerized at 190° C. for 10 hours while stirring in a nitrogen gas atmosphere to prepare a PCP solution of an aromatic polyimide having a polyimide solid content (dope concentration) of 17 wt % in PCP. The aromatic polyimide solution had a viscosity of 2000 poise at 100° C. as measured with a rotational viscometer (shear rate: 1.75 $\text{sec}^{-1}$).

Spinning of Aromatic Polyimide Solution into Hollow Fiber Membrane

The aromatic polyimide PCP solution was filtered through a 400 mesh stainless steel net to prepare a spinning dope. The dope was fed to a spinning apparatus having a hollow fiber spinneret, spun through the spinneret nozzle into a nitrogen atmosphere, and immersed in a first coagulation bath of a 75 wt % ethanol aqueous solution. The wet fiber was then immersed in a second coagulation bath of a 75 wt % ethanol aqueous solution having a pair of guide rollers, where the fiber was completely coagulated while reciprocating between the guide rolls. The wet hollow fiber having an asymmetric structure was taken up on a bobbin. The fiber was thoroughly cleaned in ethanol and immersed in isooctane for solvent replacement, dried at 100° C. to evaporate isooctane, and heat treated at 220° to 270° C. to provide an aromatic polyimide asymmetric hollow fiber membrane having an outer diameter of about 500 µm and an inner diameter of about 300 µm.

Measurement of Elongation at Break of Hollow Fiber Membrane

The elongation at break of the hollow fiber was measured with a tensile tester under conditions of an effective sample length of 20 mm, a pulling speed of 10 mm/min, and a measuring temperature of 23° C.

Evaluation of Solvent Resistance (Resistance to Organic Compound) of Hollow Fiber Membrane The hollow fiber membrane was immersed in a 60 wt % ethanol aqueous solution at 150° C. in a closed container for 20 hours. The change of elongation at break of the membrane due to the immersion was examined. The percentage of the elongation at break after the immersion to that before the immersion was obtained as a solvent resistance index. The result is shown in Table 1 below.

Making of Gas Separation Module

A bundle of six hollow fiber membranes prepared as described above was cut to make a fiber bundle of hollow fiber membrane. The opposed end portions of the fiber bundle were potted with an epoxy resin with one end of the individual hollow fiber membranes kept open, and the other end of the individual hollow fiber membranes closed, to make a hollow fiber bundle element. The hollow fiber bundle element was mounted in a housing having a feed gas inlet, a permeate gas outlet, and a retentate gas outlet to make a gas separation module containing the hollow fiber bundle element having an effective length of about 8.0 cm and an effective area of about 7.5 $\text{cm}^2$.

(6) Measurement of Ethanol Vapor Separation Performance

A 60 wt % ethanol aqueous solution was vaporized in an evaporator under atmospheric pressure to produce an organic vapor mixture containing ethanol vapor and water vapor. The vapor mixture was heated to 100° C. with a heater and fed to the gas separation module to bring the vapor mixture into contact with the outer surface (feed side) of the individual hollow fiber membranes composing the fiber bundle element to perform organic gas separation. The inside of the individual hollow fiber membranes (permeate side) was maintained under reduced pressure of 3 mmHg.

The permeate gas having an increased water vapor concentration withdrawn from the permeate gas outlet was condensed in a cooling trap cooled to around −50° C., and the condensate was collected. On the other hand, the retentate gas recovered from the retentate gas outlet (feed side) of the hollow fiber membranes, i.e., a dry gas having water vapor removed therefrom was returned to the evaporator and circulated in the gas separation module to conduct separation of the organic vapor mixture. The ethanol aqueous solution was used in large excess relative to the amount of the organic vapor that permeates through the sample hollow fiber membranes so that the composition of the organic vapor mixture may not change to such a degree as to give an influence on the measured values.

The condensate collected from the trap was weighed. Also, the concentrations of water and ethanol of the condensate were analyzed by gas chromatography to calculate the amounts of water vapor and ethanol vapor having passed through the membranes.

A water vapor permeance $P'_{H2O}$ and a water vapor to ethanol vapor permselectivity (α: $P'_{H2O}/P'_{EtOH}$) were calculated from the amount of each vapor in the permeate gas to evaluate gas separation performance. The results obtained are shown in Table 1 below. The unit of the permeance (P') is $10^{-3}$ $\text{cm}^3(\text{STP})/\text{cm}^2 \cdot \text{sec} \cdot \text{cmHg}$.

Examples 2 to 14 and Comparative Examples 1-7

A PCP solution of an aromatic polyimide was prepared in the same manner as in Example 1, except for using the diamine component and tetracarboxylic acid component shown in Table 1. The solid content (dope concentration) and the viscosity at 100° C. of the resulting aromatic polyimide solution are shown in Table 1 below.

Asymmetric hollow fiber membranes were made and a gas separation module was constructed using the hollow fiber membranes in the same manner as in Example 1, except for using each of the aromatic polyimide solutions thus prepared.

Each gas separation module was evaluated for vapor permeation performance in terms of water vapor permeance $P'_{H2O}$ and water vapor to ethanol vapor permselectivity (α: $P'_{H2O}/P'_{EtOH}$) in the same manner as in Example 1. Further-more, the hollow fibers were evaluated in terms of elongation at break and solvent resistance index. The results obtained are shown in Table 1 below.

TABLE 1

| | Tetracarboxylic Acid Component(mol %) | | | Diamine Component (mol %) | | | | | Dope Concn |
|---|---|---|---|---|---|---|---|---|---|
| | BPDA | 6FDA | DSDA | 34DADE | 44DADE | TPEQ | HFBAPP | BAPP | (wt %) |
| Example 1 | 100 | | | 20 | 20 | 60 | | | 17 |
| Example 2 | 100 | | | 30 | 30 | 40 | | | 17 |
| Example 3 | 100 | | | 30 | 30 | | 40 | | 17 |
| Example 4 | 100 | | | 10 | 50 | 40 | | | 17 |
| Example 5 | 100 | | | 40 | 40 | 20 | | | 17 |
| Example 6 | 100 | | | 30 | 30 | | | 40 | 17 |
| Example 7 | 100 | | | 30 | 10 | 60 | | | 17 |
| Example 8 | 100 | | | 10 | 10 | 80 | | | 17 |
| Example 9 | 100 | | | 50 | 10 | 40 | | | 17 |
| Example 10 | 100 | | | 10 | 50 | | | 40 | 17 |
| Example 11 | 100 | | | 50 | 10 | | | 40 | 17 |
| Example 12 | 100 | | | 10 | 50 | | 40 | | 19 |
| Example 13 | | 100 | | 20 | 20 | 60 | | | 17 |
| Example 14 | | | 100 | 20 | 20 | 60 | | | 17 |
| Comp. Ex. 1 | 100 | | | | 60 | 40 | | | 17 |
| Comp. Ex. 2 | 100 | | | 50 | 50 | | | | 17 |
| Comp. Ex. 3 | 100 | | | 3 | 57 | | 40 | | 19 |
| Comp. Ex. 4 | 100 | | | | | 100 | | | 19 |
| Comp. Ex. 5 | 100 | | | | 60 | | 40 | | 19 |
| Comp. Ex. 6 | 100 | | | 60 | | | 40 | | 19 |
| Comp. Ex. 7 | 100 | | | | | | | 100 | 19 |

| | Solution Viscosity (poise) | Permeance P'$_{H2O}$ | Permselectivity α | Elongation at Break (%) | Elongation after Immersion (%) | Solvent Resistance Index (%) |
|---|---|---|---|---|---|---|
| Example 1 | 2000 | 2.21 | 264 | 18.4 | 13.5 | 73 |
| Example 2 | 2100 | 2.34 | 278 | 16.1 | 9.7 | 60 |
| Example 3 | 2000 | 2.40 | 294 | 9.4 | 8.7 | 93 |
| Example 4 | 2300 | 2.38 | 213 | 22.4 | 13.3 | 59 |
| Example 5 | 2600 | 2.16 | 314 | 18.9 | 9.9 | 52 |
| Example 6 | 1900 | 2.13 | 277 | 12.4 | 10.1 | 81 |
| Example 7 | 2500 | 2.04 | 214 | 16.9 | 11.8 | 70 |
| Example 8 | 1500 | 2.22 | 159 | 19.3 | 13.1 | 68 |
| Example 9 | 1700 | 1.74 | 221 | 18.6 | 11.3 | 61 |
| Example 10 | 2900 | 1.49 | 196 | 12.7 | 10 | 79 |
| Example 11 | 1900 | 2.19 | 136 | 11.4 | 8.9 | 78 |
| Example 12 | 7000 | 1.99 | 123 | 10.6 | 7.7 | 73 |
| Example 13 | 3000 | 2.32 | 109 | — | — | — |
| Example 14 | 700 | 1.66 | 153 | — | — | — |
| Comp. Ex. 1 | 2700 | 2.37 | 99 | 21.1 | 13.3 | 63 |
| Comp. Ex. 2 | 1700 | 1.98 | 137 | 20.5 | 9.5 | 46 |
| Comp. Ex. 3 | 8000 | 1.58 | 58 | 11.1 | 8.7 | 78 |
| Comp. Ex. 4 | 1500 | 1.48 | 69 | 17.2 | 16.7 | 97 |
| Comp. Ex. 5 | 6500 | 1.46 | 84 | 14.3 | 10.1 | 71 |
| Comp. Ex. 6 | 4000 | 1.15 | 117 | 16.9 | 14.9 | 88 |
| Comp. Ex. 7 | 1500 | 0.84 | 52 | 27 | 26.2 | 97 |

Comparative Example 8

In a separable flask equipped with a heater, a stirrer, and an inlet and an outlet tube for nitrogen gas were put 28.95 g of a tetracarboxylic acid component consisting of 100 mol % of s-BPDA and 29.23 g of a diamine component consisting of 100 mol % of TPEQ together with 210 g of PCP and polymerized at 190° C. for 10 hours while stirring in a nitrogen gas atmosphere. However, solid matter precipitated, resulting in a failure to obtain a uniform aromatic polyimide solution and to spin hollow fibers.

Comparative Example 9

In a separable flask equipped with a heater, a stirrer, and an inlet and an outlet tube for nitrogen gas were put 28.95 g of a tetracarboxylic acid component consisting of 100 mol % of s-BPDA and 20.02 g of a diamine component consisting of 100 mol % of 34DADE together with 210 g of PCP and polymerized at 190° C. for 10 hours while stirring in a nitrogen gas atmosphere. However, polymerization did not proceed sufficiently, resulting in a failure to obtain an aromatic polyimide solution with a sufficiently increased viscosity and to spin hollow fibers.

Comparative Example 10

In a separable flask equipped with a heater, a stirrer, and an inlet and an outlet tube for nitrogen gas were put 28.95 g of a tetracarboxylic acid component consisting of 100 mol % of s-BPDA and 20.02 g of a diamine component consisting of 100 mol % of 44DADE together with 210 g of PCP and polymerized at 190° C. for 10 hours while stirring in a nitrogen gas atmosphere to prepare a PCP solution of an aromatic polyimide having a polyimide solid content of 17 wt % in PCP. The viscosity at 100° C. of the aromatic polyimide solution was 1800 poise. The aromatic polyimide solution was spun into a hollow fiber, but the hollow fiber remarkably shrank during drying. A gas separation module was constructed using the resulting hollow fiber in the same manner as in Example 1 and evaluated in terms of water vapor permeance P'$_{H2O}$. As a result, the gas separation module showed substantially no permeation of water vapor.

Example 15

The hollow fiber membrane prepared in Example 1 was evaluated for methanol/water permselectivity. The permselectivity of the hollow fiber membrane was examined in the same manner as in Example 1, except for using a methanol/water vapor mixture as a feed gas. As a result, the water vapor permeance P'$_{H2O}$ was 1.38×10$^{-3}$ cm$^3$(STP)/cm$^2$·sec·cmHg, and the water vapor to methanol vapor permselectivity was 24.

Example 16

The hollow fiber membrane prepared in Example 1 was evaluated for isopropyl alcohol/water permselectivity. The permselectivity of the hollow fiber membrane was examined in the same manner as in Example 1, except for using an isopropyl alcohol vapor/water vapor mixture as a feed gas. As a result, the water vapor permeance P'$_{H2O}$ was 2.45×10$^{-3}$ cm$^3$(STP)/cm$^2$·sec·cmHg, and the water vapor to isopropyl alcohol vapor permselectivity was 2000 or more.

Example 17

The hollow fiber membrane prepared in Example 1 was evaluated for ethyl acetate/water permselectivity. The permselectivity of the hollow fiber membrane was examined in the same manner as in Example 1, except for using an ethyl acetate vapor/water vapor mixture as a feed gas. As a result, the water vapor permeance P'$_{H2O}$ was 3.35×10$^{-3}$ cm$^3$(STP)/cm$^2$·sec·cmHg, and the water vapor to ethyl acetate vapor permselectivity was 2000 or more.

Example 18

In a separable flask equipped with a heater, a stirrer, and an inlet and an outlet tube for nitrogen gas were put 26.06 g of a tetracarboxylic acid component consisting of 100 mol % of 3,3',4,4'-biphenyltetracarboxylic acid dianhydride (s-BPDA) and 23.14 g of an aromatic diamine component consisting of 40 mol % of 1,4-bis(4-aminophenoxy)naphthalene (APN) and 60 mol % of 4,4-diaminodiphenyl ether (44DADE) together with 220 g of p-chlorophenol (PCP) and polymerized at 190° C. for 10 hours while stirring in a nitrogen gas atmosphere to prepare a PCP solution of an aromatic polyimide having a polyimide solid content of 17 wt % in PCP. The solution had a viscosity of 2700 poise at 100° C.

The aromatic polyimide PCP solution was spun to obtain a hollow fiber of continuous length with an outer diameter of about 500 µm and an inner diameter of about 300 µm. A gas separation module was made using the resulting hollow fiber. The water vapor permeance (P'$_{H2O}$) and the water vapor to ethanol vapor permselectivity (α: P'$_{H2O}$/P'$_{EtOH}$) of the gas separation module were determined. As a result, the water vapor permeance (P'$_{H2O}$) was 2.17×10$^{-3}$ cm$^3$(STP)/cm$^2$·sec·cmHg and the permselectivity (α) was 243.

Example 19

In a separable flask equipped with a heater, a stirrer, and an inlet and an outlet tube for nitrogen gas were put 23.16 g of a tetracarboxylic acid component consisting of 100 mol % of 3,3',4,4'-biphenyltetracarboxylic acid dianhydride (s-BPDA) and 25.72 g of an aromatic diamine component consisting of 40 mol % of 1,4-bis(4-aminophenoxy)naphthalene (APN), 50 mol % of 4,4-diaminodiphenyl ether (44DADE), and 10 mol % of 3,4-diaminodiphenyl ether (34DADE) together with 200 g of p-chlorophenol (PCP) and polymerized at 190° C. for 10 hours while stirring in a nitrogen gas atmosphere to prepare a PCP solution of an aromatic polyimide having a polyimide solid content of 17 wt % in PCP. The solution had a viscosity of 1300 poise at 100° C.

The aromatic polyimide PCP solution was spun to obtain a hollow fiber of continuous length with an outer diameter of about 500 µm and an inner diameter of about 300 µm. A gas separation module was made using the resulting hollow fiber. The water vapor permeance (P'$_{H2O}$) and the water vapor to ethanol vapor permselectivity (α: P'$_{H2O}$/P'$_{EtOH}$) of the gas separation module were determined. As a result, the water vapor permeance (P'$_{H2O}$) was 2.35×10$^{-3}$ cm$^3$(STP)/cm$^2$·sec·cmHg, and the permselectivity (α) was 224.

INDUSTRIAL APPLICABILITY

Because of its specific chemical composition, the gas separation membrane of the invention exhibits improvements particularly in water vapor permeance, water vapor to organic vapor permselectivity, and resistance against high temperature water and organic vapors. The gas separation method of the invention, which uses the gas separation membrane of the invention, allows for performing separation of organic vapor easily and efficiently for an extended period of time.

The invention claimed is:
1. A gas separation membrane comprising an aromatic polyimide having a repeating unit represented by general formula (1):

[Formula 1]

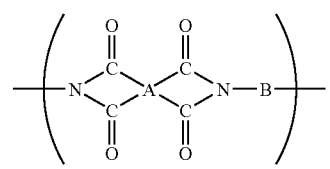

General Formula (1)

wherein A represents a tetravalent group having an aromatic ring; and B represents divalent groups comprising 10 to 90 mol % of a combination of a divalent group B1 having a 3,4'-diphenyl ether structure of chemical formula (B1) and a divalent group B2 having a 4,4'-diphenyl ether structure of chemical formula (B2) and 10 to 90 mol % of an aromatic ring-containing divalent group B3, with the molar ratio of the divalent group B1 to the divalent group B2, B1/B2, ranging from 10/1 to 1/10;

[Formula 2]

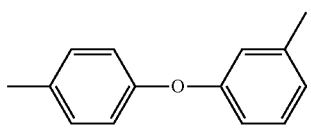

Chemical Formula (B1)

[Formula 3]

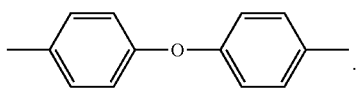

Chemical Formula (B2)

2. The gas separation membrane according to claim 1, wherein the divalent group B3 is at least one divalent group represented by chemical formula (B3):

[Formula 4]

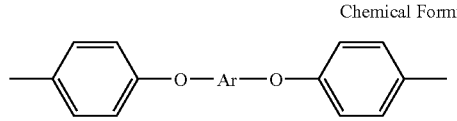

Chemical Formula (B3)

wherein Ar represents a divalent group represented by chemical formula (Ar1), (Ar2), (Ar3), or (Ar4):

[Formula 5]

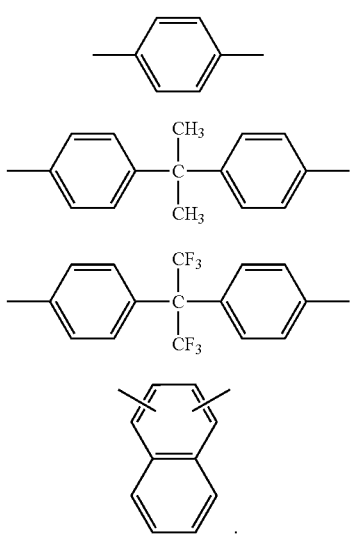

Chemical Formula (Ar1)

Chemical Formula (Ar2)

Chemical Formula (Ar3)

Chemical Formula (Ar4)

3. A gas separation membrane comprising an aromatic polyimide having a repeating unit represented by general formula (1):

[Formula 6]

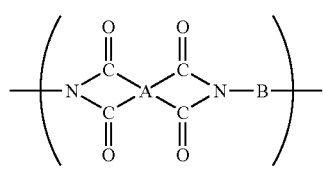

General Formula (1)

wherein A represents a tetravalent group having an aromatic ring; and B represents divalent groups comprising 10 to 100 mol % of a bis(phenoxy)naphthalene structure represented by chemical formula (2):

[Formula 7]

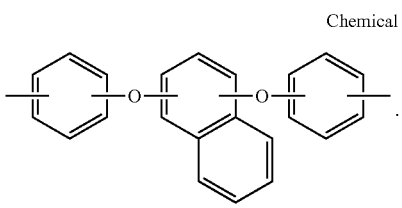

Chemical Formula (2)

4. The gas separation membrane according to claim 1, wherein the aromatic group-containing tetravalent group represented by A is a tetravalent group having a biphenyl structure represented by chemical formula (A):

[Formula 8]

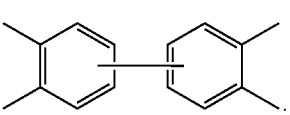

Chemical Formula (A)

5. The gas separation membrane according to claim 1, being an asymmetric membrane having a dense layer and a porous layer.

6. The gas separation membrane according to claim 1, being a hollow fiber membrane.

7. The gas separation membrane according to claim 1, having a water vapor permeance P'$_{H2O}$ of $1.0 \times 10^{-3}$ to $10.0 \times 10^{-3}$ cm$^3$(STP)/cm$^2$.sec.cmHg and a water vapor to ethanol vapor permeance ratio (P'$_{H2O}$/P'$_{EtoH}$) of 100 or more.

8. The gas separation membrane according to claim 1, having a solvent resistance index of 50% or higher.

9. A gas separation method comprising heating a liquid mixture containing an organic compound to vaporize the mixture, bringing the resulting organic vapor mixture into contact with the feed side of a gas separation membrane to selectively cause a readily permeable component to permeate the gas separation membrane, and obtaining readily permeable component-enriched permeate vapor from the permeate side of the gas separation membrane and retentate vapor substantially free of the readily permeable component from the feed side of the gas separation membrane, wherein the gas separation membrane is the gas separation membrane according to claim 1.

10. The gas separation method according to claim 9, wherein the organic compound has a boiling point of 0° to 200° C.

11. The gas separation method according to claim 9, wherein the organic compound is a lower aliphatic alcohol having 1 to 6 carbon atoms, an aliphatic ketone having 3 to 6 carbon atoms, or an ester having 2 to 7 carbon atoms.

12. The gas separation method according to claim 9, wherein the readily permeable component is water vapor.

13. The gas separation membrane according to claim 2, wherein the aromatic group-containing tetravalent group represented by A is a tetravalent group having a biphenyl structure represented by chemical formula (A):

[Formula 8]

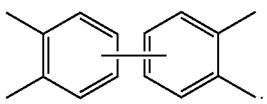

Chemical Formula (A)

14. The gas separation membrane according to claim 3, wherein the aromatic group-containing tetravalent group represented by A is a tetravalent group having a biphenyl structure represented by chemical formula (A):

[Formula 8]

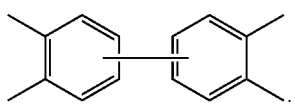

Chemical Formula (A)

15. The gas separation membrane according to claim 2, being an asymmetric membrane having a dense layer and a porous layer.

16. The gas separation membrane according to claim 3, being an asymmetric membrane having a dense layer and a porous layer.

17. The gas separation membrane according to claim 4, being an asymmetric membrane having a dense layer and a porous layer.

18. The gas separation membrane according to claim 2, being a hollow fiber membrane.

19. The gas separation membrane according to claim 3, being a hollow fiber membrane.

20. The gas separation membrane according to claim 4, being a hollow fiber membrane.

* * * * *